United States Patent

Bae et al.

Patent Number: 5,667,735
Date of Patent: Sep. 16, 1997

[54] OPTHALMIC MOLD COATINGS

[75] Inventors: Young C. Bae, Seoul, Rep. of Korea; Thomas B. Ottoboni, Belmont, Calif.; Kwan Chan, San Francisco, Calif.; Thai Minh Nguyen, San Jose, Calif.; Fredric J. Lim, Fremont, Calif.; David S. Soane, Piedmont, Calif.

[73] Assignee: 2C Optics, Inc., Hayward, Calif.

[21] Appl. No.: 633,220

[22] Filed: Apr. 16, 1996

Related U.S. Application Data

[63] Continuation of Ser. No. 248,063, May 23, 1994, abandoned.

[51] Int. Cl.$^6$ ................................................ B29D 11/00
[52] U.S. Cl. .................................... 264/1.7; 523/168
[58] Field of Search ............................ 523/168; 264/1.7

[56] References Cited

U.S. PATENT DOCUMENTS

| | | | |
|---|---|---|---|
| 3,968,305 | 7/1976 | Oshima | 428/334 |
| 3,968,309 | 7/1976 | Matsuo | 428/409 |
| 4,199,421 | 4/1980 | Kamada | 204/159.22 |
| 4,719,146 | 1/1988 | Hohage | 428/331 |
| 4,756,972 | 7/1988 | Kloosterboer | 428/417 |
| 4,758,448 | 7/1988 | Sandvig et al. | 427/54.1 |
| 4,774,035 | 9/1988 | Carmelite | 264/1.4 |
| 5,049,321 | 9/1991 | Galic | 264/1.4 |
| 5,114,632 | 5/1992 | Soane | 264/22 |
| 5,122,061 | 6/1992 | Wakumoto | 433/228.1 |
| 5,160,668 | 11/1992 | Imus | 264/1.7 |
| 5,246,728 | 9/1993 | Rodriquez | 427/2 |
| 5,278,243 | 1/1994 | Soane | 525/288 |

*Primary Examiner*—Irina S. Zemel
*Attorney, Agent, or Firm*—Fish & Richardson P.C.

[57] ABSTRACT

A method is provided for applying a coating to an ophthalmic device by applying a coating to a face of the mold used to make the device and partially curing the coating, or, if the viscosity is sufficiently high, leaving the coating uncured. Then the liquid used to form the lens is poured into the mold and the liquid and coating are concurrently cured.

26 Claims, No Drawings

OPTHALMIC MOLD COATINGS

This is a continuation of application Ser. No. 08/248,063, filed May 23, 1994, now abandoned.

BACKGROUND OF THE INVENTION

Most ophthalmic lenses dispensed today are made from plastic materials, such as diethylene glycol bisallyl carbonate (CR-39) or polycarbonate. Plastic lenses are inexpensive to fabricate, yet possess good optical properties and are lighter in weight than glass lenses. However, since plastic lenses are easily abraded compared to glass lenses, numerous optical coatings have been developed to improve the abrasion resistance of plastic lenses and to also improve chemical resistance.

A hard coat is usually applied, to the plastic lens using traditional processes such as spin coating, flowing coating, dip coating, spray coating, or other methods. The coating is then cured using heat or UV radiation after deposition. An alternate method that is applicable for casted products is to simultaneously coat and polymerize both the lens resin and the coating while in the mold. For example, Oshima et al, U.S. Pat. No. 3,968,305, describe a process where the coating material consisting of (a) 20 to 100% by weight of a compound having at least three acryloxy and or methacryloxy groups, with the compound having a chain length of not more than 20 carbon atoms and (b) 0 to 80% by weight of at least one copolymerizable monoethylenically or diethylenically unsaturated compound is first spread over all or part of the inner surface of a mold member. A solid film with little affinity for the coating material is placed above the coating such, that no air bubbles are trapped. The material is then polymerized to an extent that the partially polymerized coating is not dissolved or swelled by the addition of monomer which eventually form the polymeric body. After the pre-polymerization step, the solid film is removed leaving the partially cured coating on the mold surface. The mold is then filled with monomer and fully polymerized resulting in a finished product with an abrasion resistant surface. This process is used to coat polymethyl methacrylate (PMMA) or poly-(diethylene glycol bisallyl carbonate) parts.

Matsuo et al., U.S. Pat. No. 3,968,309, describe the coating material consisting of at least 30% by weight of at least one polyfunctional compound having at least three methacryloxy or acryloxy groups per molecule, and a fluorine-containing surfactant where the fluorine atom is bonded to a carbon atom. An in-mold coating process is described which consists of applying the coating material at a predetermined thickness onto the inner surface of a mold and then irradiating with an energy source in an oxygen-free atmosphere to form a cured film on the inner mold surface. The mold cavity is then filled with a castable material, such as methacrylate syrup or allyl diglycol carbonate and polymerized to obtain a molded article having an abrasion resistant film.

Sandvig et al., U.S. Pat. No. 4,758,448, describe an in-mold coating process for ophthalmic lenses, including multi-focal lenses. The coating material is a mixture of monomers and/or ogligomers with at least one component containing reactive ethylenically unsaturated groups. The coating is applied onto the surface of a mold and reacted so that it forms a dry film but may be tacky to the touch. A degree of unsaturation in the range of about 30 to 90% is required after the initial reaction step. The mold is then filled with a castable material and reacted. Sandvig et al. suggest that in column 2, lines 33–37 that the formation of an abrasion-resistant film on the mold prior to the introduction of the monomer, which is described in Oshima et al., U.S. Pat. No. 3,968,305, would not work for the in-mold curing process.

Sandvig et al. also describe problems with the performance of the coating if, during the partial reaction step, the film is not properly cured. For example, if the film under cured, the resulting system shows poor abrasion resistance and maybe hazy. Sandvig et al., suggest that the coating be at least 10% cured prior to the casting of the lens, and during this initial curing process, the resulting film may be tacky to the touch, but must be dry.

Carmelite et al., U.S. Pat. No. 4,774,035, describe a coating material composed primarily (80 to 95% by weight) of reactants having at least a triacrylate functionality and between 5 to 20% by weight of a diacrylate reactant, photoinitiator, polymerization inhibitor, silane adhesion promoter and an acid to activate the adhesion promoter. The adhesion promoter is used to obtain better adhesion between the coating material and metal or glass molds to reduce defects associated with delamination of the coating material from the mold face. The coating is applied to the mold surface as described in the previous patents utilizing an in-mold curing process, and polymerized in air such that a hard abrasion resistant coating is formed on the mold. The mold cavity is then filled with the lens forming resin and cured.

Finally, Galic, U.S. Pat. No. 5,049,321 (1991), describes an in mold coating process similar to that of Carmelite et al. The coating is first applied to the inner mold surface and partially cured in air such that the reactants are substantially polymerized to form a hard abrasion resistant state but with sufficient acrylate functionality at the lens/coating interface for further reaction. The mold cavity is filled with the lens forming resin and cured completely.

SUMMARY OF THE INVENTION

The present invention discloses a procedure for providing abrasion and scratch resistance for ophthalmic and other castable plastic lenses. An important factor for the success of this method is to employ coating and lens casting resins that are thermodynamically compatible. The coating resin is first applied to the surface of one or both faces of the mold half using techniques such as flow coating, spray coating, or any of the wiping techniques. With the present invention, the uniformity of the coating thickness is not critical. However, it is necessary that the coating completely cover the surface of the mold. The film is then partially cured in air, using UV radiation, to form a wet film. If the coating resin has a sufficiently greater viscosity (preferably larger than 1.5 times) than the casting resin, this initial curing step may be unnecessary. The mold is then filled with a reactive casting resin that is compatible with the reactive materials in the coating and preferably contains at least one of the reactive components of the coating. The present invention therefore provides a method for providing an optically clear coating to at least one optical surface of an ophthalmic device comprising the steps of applying a layer of a composition comprising reactive ethylenically unsaturated groups to at least a first face of a mold used to manufacture said ophthalmic device, wherein the face imparts a desired optical configuration to a first optical surface of the ophthalmic device; reacting the composition to a degree that it forms a nonabrasion-resistant film that is wet, at least weakly adhered to the first face, and replicates the first face in an aberration-free manner; filling the mold with an organic liquid material capable of hardening to a solid, room temperature-stable state wherein the organic liquid material is thermodynamically compatible with the film composition comprising reactive ethylenically unsaturated groups; and concurrently hardening the organic liquid material and film material to form the ophthalmic device, intimately bonding the film to the hardened organic material, thus rendering film abrasion-resistant and adhering the film to the optical surface of the hardened organic material more firmly than it adheres to the face of the mold.

Alternatively, if the viscosity of the film material comprising reactive ethylenically unsaturated groups has sufficiently higher viscosity than the viscosity of the organic material, the partial reacting of the film material prior to applying the organic liquid material to the molds may not be necessary.

This is an improvement over the prior art which requires that the coating be pretreated to an extent that it is dry, meaning that it will not flow by itself, can be tacky to the touch but is deformable by touching, and in most instances therefore must be reacted until it exhibits a degree of unsaturation of about ninety percent or less.

It is important that the coating material and the lens resin be miscible with each other and have similar reactivities to the curing agent and conditions to eliminate problems such as haziness or poor bonding. The use of thermodynamically compatible, highly reactive materials also obviates the requirement of Sandvig et al to form a dry film that is at least 10% cured (i.e., contains a degree of unsaturation of 90% or less than that of the unreacted material) prior to the casting of the lens.

DESCRIPTION OF THE PREFERRED EMBODIMENTS

Coating Compositions

One class of abrasion resistant, radiation curable, tintable, coating compositions utilized in accordance with the present invention which are curable under vacuum or in inert atmosphere such as nitrogen, comprise:

I. Ten to fifty parts of polyacryloylated alkane polyols, wherein the alkane polyols contain up to about 20 carbon atoms and an average of at least three O-acryloyl groups;

II. Twenty to eighty parts of alkane polyols, wherein the alkane polyols contain up to about 20 carbon atoms and an average of at least three O-[acryloyl-(polyalkylene oxide)] chains; wherein each of the polyalkylene oxide chains comprise from one to twenty alkylene oxide groups;

The composition will also contain a photoinitiating amount of a photoinitiator, typically between one and about six parts. Viscosity modifiers, typically up to 500 parts may be added, as well as dyes, surfactants and adhesion promoters may also be included in the composition in small amounts.

All parts are by weight described herein.

Another class of an abrasion-resistant, radiation curable coating compositions used in accordance the present invention can be cured in the presence of air, and comprise:

I. Twenty to forty parts of polyacryloylated alkane polyols, wherein the alkane polyols contain up to about twenty carbon atoms and an average at least three O-acryloyl groups;

II. Fifty to eighty parts of alkane polyols, wherein the alkane polyols contain up to about twenty carbon atoms and an average of at least three O-[acryloyl-(polyalkylene oxide)] chains; wherein each of the polyalkylene oxide chains comprise from one to twenty alkylene oxide groups; and III. Optionally, five to thirty parts of an acrylated material which promotes adhesion of the cured coating composition to the substrate.

This composition will also contain a photoinitiating amount of a photoinitiator, typically one to about six parts, as well as optional viscosity modifiers, dyes and surfactants.

The coating compositions are useful on plastic ophthalmic lenses. The coating compositions are particularly advantageous when used with compatible organic material which can be hardened into ophthalmic lenses.

The coating compositions are applied to the optical surfaces of the mold using conventional methods such as spin coating, flow coating, spray coating, wiping and other methods well-known to those of ordinary skill in the ophthalmic lens coating art. A typical spin coating method of coating ophthalmic lenses is described, for example, in U.S. Pat. No. 5,246,728. A typical coating will have a thickness of one to fifteen microns and it is realized that the thickness applied by spin coating is correlated to the viscosity of the material and the rotational speed of the spinning process. The coating should impart no color (such as yellowness) to the article coated.

After application of the coating, it is preferably partially cured by exposure to radiation, such as radiation from a high energy ultraviolet light source, for several seconds. Typical UV radiation sources include an electrodeless tube lamp (made by Fusion Systems) or a medium pressure mercury vapor lamp tube (made by American Ultraviolet Products). The preferred wavelengths for photoinitiation are between 180 and 500 nanometers and the power output of the light source is preferably between about twenty and 500 watts per inch of the source length. The articles may be cured by placing them under a lamp for the desired period of time or by passing the articles in front of the lamp on a conveyor system. Articles which are coated on both sides may have both sides cured simultaneously by using light sources on each side of the article. After partial curing, the coating surface will still be wet and can be removed from the mold by touching or wiping with a finger. The photoinitiated curing reactions of the compositions according to the present invention involve free-radical polymerization. Examples of such photoinitiators are Darocure 1173, Irgacure 184, and a 1:1 mixture of benzophenone, Irgacure 907 or Irgacure 500.

The polyacryolated alkane polyols will contain up to twenty carbon atoms and have an average of over two O-acryloyloxy groups and have the following formula

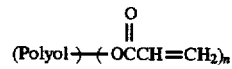

wherein n is greater or equal to three and the "polyol" portion is an alkane polyol having up to about twenty carbon atoms. It will be understood that the polyacryolated alkane polyols need not be, and typically are not, pure compounds, but rather are provided as a mixture of compounds wherein the alkane polyol has a plurality of alcohol groups, some of which may be acryolated and some of which may be free hydroxyl groups. Thus, the alkane polyols are described as containing an average number of O-acryloyl groups.

The alkane polyol refers to a polyhydroxy alkane wherein the alkane may be a straight, branched or cyclic alkane containing up to about twenty carbon atoms. Preferably, branched alkane polyols are utilized, such as tetra-(2- hydroxy-ethyl)-methane; 3,4,5,6-tetra-(2-hydroxy-ethyl)-1-hydroxy-heptane, 2-ethyl-2(hydroxymethyl)-1,3-propanediol, and the like.

As used herein it will also be understood that methacrylate can be substituted for an acrylate group and they are viewed as being equivalent to each other within the context of the present invention.

As used herein the term "alkylene oxide" is a divalent group comprising an alkyl chain bonded to an oxygen atom with open valences on the oxygen atom and on one of the carbon atoms in the alkyl chain. Hence, ethylene oxide is —CH$_2$—CH$_2$—O, propylene oxide is —CH(CH$_3$)—CH$_2$—O—, etc.

Examples of the polyacrylated alkane polyols having up to twenty carbon atoms and at least three acryoloxy groups are Sartomer 9041 (a dipentaerythritol multiacrylate), Sartomer 295 (a pentaerythritol tetraacrylate), Sartomer 399 (a dipentaerythritol pentaacrylate) and Radcure TMPTA (trimethylolpropane triacrylate).

An alkane polyol containing up to twenty carbon atoms and an average of an average of over 2 O-[acryloyl-(polyalkylene oxide)] chains is a compound the following formula

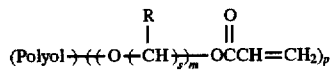

wherein p is greater or equal to three, each m is independently an integer from one to twenty, s is from one to six, and each R is independently H or lower alkyl, preferably methyl. In compositions wherein the polyalkylene oxide chains comprise from four to six alkylene oxide groups, then each m is independently an integer from four to six. Preferably the alkylene oxide groups are ethylene oxide or propylene oxide, i.e. wherein compounds wherein s is two, and both R groups are H or one R group is H and the other R group is methyl. Examples of such compounds include Sartomer 454 (ethoxylated TMPTA), Sartomer 502 (a highly ethoxylated TMPTA), Sartomer 494 (ethoxylated pentaerythritol tetraacrylate) and Sartomer 9035 (a highly alkoxylated triacrylate). An example of a compound wherein the polyalkylene oxide group contains from four to six alkylene oxide groups is Sartomer 499 (ethoxylated TMPTA).

As indicated above, each of the formulations, will contain a photoinitiating amount of a photoinitiator, usually in a proportion of 0.05 to six parts, preferably 0.1 to 0.8 parts. Examples of such photoinitiators are Darocure 1173 (2-hydroxy-2-methyl-1-phenylpropan-1-one, Irgacure 184, 907 (2-methyl-1-[4-(methylthio)phenyl]-2-morpholinopropanone-1) or 500 (1-hydroxycyclohexylphenyl ketone: benzophenone, 1:1 mixture).

Finally, the formulations may contain viscosity modifiers, such as alcohols (typically n-propanol and/or n-butanol) or acrylate esters, dyes or surfactants (such as surfactant FC430, sold by 3M). In a preferred embodiment, dye will be a component of the coating formulation.

Hardenable Ophthalmic Lens Compositions

With the partially cured coating on the mold, the mold is then filled with the hardenable organic material which forms the ophthalmic lens. This organic material is a polymerizable composition, and the polymer formed thereby, curable by UV light. Any of such UV-curable organic material used to make ophthalmic devices, such as lenses, may be utilized.

A preferred polymerizable organic material comprises:

I. 10 to 80 parts of polyacrylated alkane polyols, wherein the alkane polyols contain up to about 20 carbon atoms and greater than 2 up to about 10 O-acryloyl groups; and II. 80 to 10 parts of polyalkoxylated polyacrylated alkane polyols, wherein the alkoxylated alkane polyols contain up to about 20 carbon atoms and greater than 2 up to about 10 O-acryloyl groups;

III. up to 60 parts, and preferably at up to 30 parts, of urethane oligomers end-terminated with acrylate or methacrylate (or mixtures of acrylate and methacrylate) groups and preferably containing 2 to 10 acrylate groups;

IV. conventional optional additives, including but not limited to free radical initiators, UV absorbers, mold release agents, stabilizers, dyes, antioxidants, and wetting agents.

All parts are by weight described herein.

This polymerizable composition can be cast using UV radiation to produce an optically transparent object with low haze that has impact and abrasion resistance approximately equal to or better than CR-39. In one embodiment, the polymerizable composition has a viscosity of greater than 200 cps.

In a preferred embodiment, this polymerizable composition is cast using the sequential polymerization method, as described in more detail below, in a time ranging from 10 minutes to 30 minutes depending on the polymerizable composition, initiator concentration, and UV intensity employed. Relatively high viscosity polymerizable solutions can be cast using the sequential polymerization method since the fluid can be introduced into the mold cavity without entrapping air. The ability to use high viscosity polymerizable solutions allows flexibility in choosing the kind and concentration of monomer and oligomer.

The article obtained by the radiation curing is sufficiently hard for most purposes and requires no further hardening. Articles made with the compositions according to the present invention, may be tinted in a conventional tint bath using water-dispersed dye-stuffs which are commonly used in the ophthalmic industry.

The polyacryolated alkane polyols of component I will contain up to twenty carbon atoms and have an average of over two O-acryloyloxy groups and have the following formula

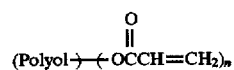

wherein n is greater or equal to three and the "polyol" portion is an alkane polyol having up to about twenty carbon atoms. It will be understood that the polyacryolated alkane polyols need not be, and typically are not, pure compounds, but rather are provided as a mixture of compounds wherein the alkane polyol has a plurality of alcohol groups, some of which may be free hydroxyl groups. Thus, the alkane polyols are described as containing an average number of O-acryloyl groups.

The alkane polyol refers to a polyhydroxy alkane where the alkane may be a straight, branched or cyclic alkane containing up to about twenty carbon atoms. Preferably, branched alkane polyols are utilized, such as tetra-(2-hydroxy-ethyl)-methane; 3,4,5,6-tetra-(2-hydroxy-ethyl)-1-hydroxy-heptane, 2-ethyl-2(hydroxymethyl)-1,3-propanediol, and the like.

As used herein it will also be understood that methacrylate can be substituted for an acrylate group and they are viewed as being equivalent to each other within the context of the present invention.

As used herein the term "alkylene oxide" is a divalent group comprising an alkyl chain bonded to an oxygen atom with open valences on the oxygen atom and on one of the carbon atoms in the alkyl chain. Hence, ethylene oxide is —CH$_2$—CH$_2$—O, propylene oxide is —CH(CH$_3$)—CH$_2$—O—, etc.

Examples of the polyacrylated alkane polyols having up to twenty carbon atoms and at least three acryoloxy groups are Sartomer 9041 (a pentaacrylate ester), Sartomer 295 (a pentaerythritol tetraacrylate), Sartomer 399 (a dipentaerythritol pentaacrylate) and Radcure TMPTA (trimethylolpropane triacrylate). The alkane portions of the alkane polyol may contain ether linkages, —O—.

A polyalkoxylated polyacrylated alkane polyol of component II will contain up to about twenty carbon atoms and an average of at least three O-acryloyl groups. Preferred compounds containing [acryloyl-(polyalkylene oxide)] chains have the following formula

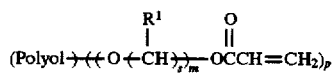

wherein p greater than 2, each m is independently an integer from one to twenty, s is from one to six, and each R and R$^1$ is independently H, lower alkyl or hydroxy alkyl, preferably methyl or hydroxymethyl. In compositions wherein the polyalkylene oxide chains comprise from four to six alkylene oxide groups, then each m is independently an integer from four to six. Preferably the alkylene oxide groups are ethylene oxide or propylene oxide, i.e. wherein compounds wherein s is two, and both R groups are H or one R group is H and other R group is methyl. Examples of such compounds include Sartomer 454 (ethoxylated TMPTA), Sartomer 502 (a highly ethoxylated TMPTA), Sartomer 494 (ethoxylated pentaerythritol tetraacrylate) and Sartomer 9035 (a highly alkoxylated triacrylate). An Example of a compound wherein the polyalkylene oxide group contains from four to six alkylene oxide groups is Sartomer 499 (ethoxylated TMPTA).

As indicated above, each of the formulations, will contain a photoinitiating amount of a photoinitiator, usually in a proportion of 0.05 to 10.0 parts, preferably from 0.1 to 0.8 parts per hundred of curable composition. Examples of such photoinitiators are Darocure 1173 (2-hydroxy-2-methyl-1-phenylpropan-1-one, Irgacure 184, 907 (2-methyl-1-[4-(methylthio)phenyl]-2-morpholino-propanone-1) or 500 (1-hydroxcyclohexylphenyl ketone: benzophenone, 1:1 mixture).

The composition for curing in air may also comprise from five to thirty parts of an acrylated material which will promote adhesion of the cured material to the substrate such as tetrahydrofurfuryl acrylate (Sartomer 285) or a 1,6-hexane diol diacrylate monomer (such as 1,6-HDODA Radcure).

Finally, the formulations may contain viscosity modifiers, such as alcohols (typically n-propanol and/or n-butoanol) or acrylate esters, dyes or surfactants (such as Surfactant FC430, sold by 3M).

In particular, urethane acrylate or methacrylate oligomers (or mixtures thereof) are selected as component III that impart desired abrasion and impact resistance to the lens and reduce the amount of shrinkage that occurs during polymerization, because the ratio of non-reacting to reacting components is high. These oligomers have a relatively high viscosity, typically between one and one hundred megapoise at room temperature when undiluted. Therefore, these oligomers were not appropriate for use in the traditional manufacture of lenses using blanket radiation, in more than minor amounts.

As used herein, the term "aryl" or "aromatic" refers to phenyl, phenyl substituted with alkyl or halogen, naphthalene or naphthalene substituted with alkyl or halogen, or higher aromatics, either unsubstituted, or substituted with alkyl or halogen, or other substituent which does not interfere with the curing reactions.

As used herein, the term (meth)acrylate refers to either acrylate, methacrylate, or a mixture of acrylate and methacrylate.

The term aralkyl refers to an aryl group with an alkyl substituent.

The term alkaryl refers to an alkyl group that has an aryl substituent.

The term alkenyl, as referred to herein, and unless otherwise specified, refers to a straight, branched, or cyclic (in the case of C$_{5-6}$) hydrocarbon of C$_2$ to C$_{20}$ with at least one double bond.

As used herein, the term oligomer refers to a compound with about 20 or less repeating units, of typical weight average molecular weight ranging from 400 to 9000, and preferably, between 800 and 2500.

As used herein, the term aliphatic refers to an alkyl, alkenyl, or alkynyl group of C$_1$ to C$_{20}$.

As used herein, the term "chain polymerization" refers to a polymerization process in which there is a series of reactions each of which consumes a reactive particle and produces another, similar particle. The reactive particles are radicals, anions, or cations. The polymerization of reactive particles occurs without elimination of a small molecule (as in during a typical condensation reaction). Chain polymerization is typically carried out with ethylenically unsaturated monomers.

As used herein, the term "unsaturated hydrocarbon polymer" refers to a polymer that consists essentially of carbon and hydrogen atoms, and that includes alkene (vinyl) groups in the polymer.

As used herein, the term "high impact resistant material" refers to a material that will withstand sudden imposition of sudden force without fracture, and that passes the U.S. Food and Drug Administration's requirement for impact resistance for ophthalmic lenses (the standard drop-ball test).

As used herein, the term "high scratch resistant" material refers to a material that will withstand abrasion without substantial surface deterioration. A typical abrasion test consists of applying a known vertical pressure on the sample, while moving a steel-wool pad laterally against the surface. Visible scratches are then counted after a number of rubbing movements. A high-scratch resistant material will exhibit only a few scratches after this process.

Proper selection of the oligomer, component III, is important to obtaining the desired physical properties of the resulting lens. Polymers prepared from acrylate and methacrylate terminated oligomers are known for their outstanding optical and mechanical properties. Because they can be tailored to obtain desired mechanical properties by blending various materials, they are candidates for numerous applications including coatings, adhesives, medical plastics, lenses, fiber optics and glazing materials.

It has been discovered that oligomers are preferred for the preparation of ophthalmic lenses using the sequential polymerization method: urethanes end terminated with acrylate or methacrylate (or mixtures thereof). In general, urethane oligomers impart toughness and abrasion resistance to the final lens, while epoxy and polyester oligomers impart hardness and chemical resistance. In a preferred embodiment, the oligomers used in the manufacture of lenses have molecular weights ranging from 400 to 9000, but preferably between 800 and 2500. High molecular weight oligomers can produce a lens with too much flexibility, while low molecular weight oligomers can produce a lens that is too rigid with low impact resistance. The functionality (acrylate or methacrylate) of the oligomers can range from 2 to 10. The oligomers should comprise between up to 60% by weight of the final formulation, preferably between than 0–40% of the composition, and more typically, between 20–40% by weight in the composition.

Polyurethanes are a general class of polymers that contain at least two —NHCOO— linkages in the backbone of the polymer, optionally along with other functional groups in the backbone such as esters, carbonates, ethers, ureas and amides. Polymers prepared from urethane oligomers exhibit good abrasion resistance, toughness, flexibility for impact resistance, clarity, and stain resistance. These properties, which have made urethanes useful in the coatings industry, are also important attributes of ophthalmic products.

There are a wide variety of ways known to those skilled in the art to prepare urethane polymers. Urethane prepolymers are typically reaction products of aliphatic or aromatic polyols, polyester-polyols, or polyether-polyols of diverse composition with a stoichiometric excess of diisocyanate. Typically, the number of terminal hydroxyl groups of the aliphatic or aromatic polyol, polyester-polyols, or polyether-polyols is two or greater. The terminal hydroxyl groups react with the diisocyanate to produce urethane linkages, and the resulting prepolymer becomes end capped with isocyanate groups. Depending on the stoichiometric ratio of NCO/OH groups, the urethane linkage can also be incorporated into the backbone of the isocyanate terminated oligomer. Different urethanes can be obtained by changing (1) the diisocyanate, (2) the polyol, polyester, or polyether, or (3) the NCO/OH stoichiometric ratio. For a description of urethane oligomers and polymers, see Frisch, K. C., Applied Polymer Science (eds. J. K. Craver & R. W. Tess), Chapter 54, p. 828, ACS, ORPL, Washington, 1975.

Examples of suitable diisocyanates include 4,4'-diphenylmethane diisocyanate (MDI, available from ICI Polyurethanes Group, West Deptford, N.J.; PBA 2259 (a more stable water dispersible version of MDI also available from ICI Polyurethanes Group); 3-isocyanatomethyl-3,5,5-trimethylcyclohexyl isocyanate (IPDI, or isophorone diisocyanate, available from Huls America, Inc.); 2,4- and 2,6-toluene diisocyanate (TDI); ethylene diisocyanate, trimethylene diisocyanate, tetramethylene diisocyanate, hexamethylene diisocyanate, octamethylene diisocyanate, decamethylene diisocyanate, cyclohexyl diisocyanate, methylenebis-(4-cyclohexylisocyanate), phenylene diisocyanate, diphenylether-4,4'-diisocyanate, 2,2,4-trimethylhexamethylene diisocyanate, xylene diisocyanate, tetramethyl xylene diisocyanate, polyether diisocyanate, polyester diisocyanate, polyamide diisocyanate, dianisidine diisocyanate, 4,4'-diphenylmethane diisocyanate, toluidine diisocyanate, and dimer acid diisocyanate (a diisocyanate prepared from the reaction product of two unsaturated carboxylic acids).

Urethane prepolymers are made radiation curable by adding acrylate or methacrylate groups to the prepolymer. This is typically accomplished by reacting the isocyanate terminated oligomer with hydroxy substituted acrylates or methacrylates. Examples include but are not limited to 2-hydroxyethyl (meth)acrylate, 2-hydroxypropyl (meth) acrylate, dodecyloxyhydroxypropyl (meth)acrylate, and glycerin (meth)acrylate. Higher (meth)acrylate functionality can be obtained by reacting the isocyanate terminated oligomer with compounds such as pentaerythritol tri (meth) acrylate, which contains approximately one equivalent of hydroxyl and three (meth)acrylate groups per mole of compound. Alternatively, acrylate or methacrylate esters that include other functional groups that can react with an isocyanate can also be used, such as epoxy containing compounds such as glycidyl acrylate or methacrylate, or amino containing esters such as aminoalkyl or aminoaryl acrylate or methacrylate.

A nonlimiting example of a difunctional or trifunctional urethane prepolymer is shown below:

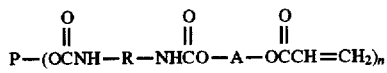

wherein P is an aliphatic or aromatic polyether, polyester or polyol, R is the residue of the diisocyanate to which the isocyanate moieties are attached, n=2 or 3 and A is the aliphatic (typically alkyl) or aromatic ester portion of the hydroxylated acrylate or methacrylate used to end-cap the oligomer.

The properties of the acrylate or methacrylate terminated urethane oligomers depend on the backbone structure. Alkyl esters and ethers yellow less and are more stable to light than aromatic esters and ethers. However, aromatic esters and ethers impart hardness to the composition, and possess a higher refractive index than their alkyl counterparts, which is desirable to reduce lens thickness for a given prescription. Also, polyester based urethane acrylates or methacrylates are generally harder than polyether based systems because polyesters provide a more polar bond structure and a more basic oxygen with which stronger dipolar and hydrogen bonding interactions can occur with the urethane segments.

Hydroxy terminated polyester starting materials are often prepared from dicarboxylic acids or anhydrides, including but not limited to adipic acid, phthalic anhydride, and dimerized linoleic acid, with monomeric glycols and triols. Examples of glycols include ethylene glycol, propylene glycol, 1,2-butylene glycol, 1,4-butylene glycol, 1,6-hexylene glycol, trimethylolpropane, glycerol, and 1,2,6-hexanetriol.

Widely used polyether diols and polyols used to produce urethane oligomers include poly(oxypropylene) glycol, poly (1,4-oxybutylene)glycol, random copolymers of alkylene oxides and copolymers of tetrahydrofuran and alkylene oxides. Depending on the diisocyanate monomer, polyol group and stoichiometric ratio, urethane oligomers with widely different mechanical and chemical properties result.

Branched urethane oligomers based on branched polyols, polyesters, or polyethers are also useful in the polymerizable composition.

Since the urethane methacrylate or acrylate has a functionality greater than one, the resulting material after polymerization is a thermoset rather than a thermoplastic material. The material cannot be reprocessed once it is cast, but has the advantage of significant chemical resistance and thermo-mechanical stability. An important factor that affects the mechanical properties of thermosets is the crosslink density of the network. Increasing the density, which is achieved by either decreasing the molecular weight between acrylate groups or increasing the functionality of the oligomer, in general leads to a higher Tg and a more abrasion resistant system. However, loss of flexibility, which causes poor impact resistance and greater shrinkage during casting, is also a result of high crosslink density.

Examples of suitable commercial acrylate or methacrylate terminated urethanes that can be used in the polymerizable composition disclosed herein include but are not limited to urethane acrylates 2264, 284, 4881, 4866, 8301 and 8804 from UCB Radcure, urethane acrylates CN955, CN960, CN961, CN963 and CN970 from Sartomer Company, and urethane acrylate NR2075 from Imperial Chemical Ind.

Initiator

Any UV or thermal free radical initiator or mixture of initiators known to those skilled in the art of free radical polymerization can be used to initiate polymerization. Mixtures of the photoinitiators are sometimes preferred since they can in certain cases provide a more efficient production of radicals. The initiator should be non-yellowing, have a broad absorption spectrum if it is a UV initiator, and good curing efficiency. It should also be nontoxic and have low odor. Concentrations of the initiator in the polymerizable composition typically range from 0.05 to 10% by weight, although any amount can be used that provides the desired product. A relatively low concentration of initiator, between 0.1 to 0.8% by weight, is preferred to reduce yellowing.

There are a number of non-yellowing commercially available UV initiators. Examples include but are not limited to Irgacure 184 (1-hydroxycyclohexyl phenyl ketone), and Darocur 2959 or 1173 sold by Ciba Geigy Corporation, and KIP 100F (2-hydroxyalkyl phenone) sold by Fratelli Lamberti Esacure. KIP 100F and Darocur 2959 and 1173 are liquids, that are readily miscible with the other components of the polymerizable composition. Irgacure 184 is a white powder with extremely good absorbance and non-yellowing properties.

Other UV and thermal initiators include benzophenone, trimethylbenzophenone, isopropylthioxanthone, and ethyl 4-(dimethylamino)benzoate, benzoyl peroxide, acetyl peroxide, lauryl peroxide, azobisisobutyronitrile, t-butyl peracetate, cumyl peroxide, t-butyl peroxide, t-butyl hydroperoxide, bis(isopropyl)peroxydicarbonate, benzoin methyl ether, 2,2'-azobis(2,4-dimethylvaleronitrile), tertiarybutyl peroctoate, phthalic peroxide, diethoxyacetophenone, and tertiarybutyl peroxypivalate, diethoxyacetophenone, 1-hydroxycyclohexyl phenyl ketone, 2,2-dimethoxy-2-phenyl-acetophenone, phenothiazine, and diisopropylxanthogen disulfide.

Inhibitors

Inhibitors are optionally added to the polymerizable composition to inhibit polymerization under normal storage conditions, by acting as radical scavengers. Any inhibitor known to those skilled in the art can be used in any effective concentration. The most common inhibitors are hydroquinone (HQ) and hydroquinone monomethylether (MEHQ). HQ has been found to increase yellowing at high concentrations while MEHQ does not. Inhibitor levels should be minimized since they retard the speed of the initiation and propagation process during polymerization. Typical concentrations in the final formulations are optimally between 0.002 to 0.2 weight percent.

UV Stabilizers

Stabilizers can be used to prevent changes in lens properties with time. These include UV absorbers (UVA), hindered light amine stabilizers (HALS) and antioxidants (AO). UVAS preferentially absorb incident UV radiation, thereby preventing the radiation from reaching the casted polymer. Examples include Tinuvin 328, Tinuvin 900, and Tinuvin 1130 from Ciba Geigy. HALS do not function by absorbing UV radiation, but inhibit degradation of the casted polymer by binding with free radicals. Examples include Tinuvin 292, and Tinuvin 144 from Ciba Geigy. AOs also terminate free radicals, particularly those associated with peroxy radicals. They are not generally used as light stabilizers. Examples include Irganox 1010 and Irganox 1076 from Ciba Geigy.

The lens material can also be protected from UV radiation after casting, by applying an anti-UV coating or by dipping the lens in a suitable solution.

Other Additives

Internal mold releases can be added to the polymerizable composition to improve releasability from the molds, but are not required, and if possible, should be avoided as they can reduce clarity. Examples of release agents include butyl stearate, dioctylphthalate, Zelec UN and Zelec NE sold by E.I. DuPont NeMours and Company. Other additives, such as dyes and wetting agents, can also be included.

Process of Polymerization

The problem of shrinkage and lengthy cure time associated with the traditional casting process for ophthalmic lenses are solved by casting the polymerizable composition disclosed herein using the sequential polymerization technique taught in U.S. Pat. Nos. 5,110,514 and 5,114,632 to Soane. The sequential polymerization method minimizes stress and cavitation, or voids caused by the shrinkage of material during polymerization, that would other wise cause material stress and decrease mold replication reliability. The sequential process is easily adapted to either radiation or thermal curing. Radiation curing is preferred because it is more convenient and in general requires a shorter cure time. Radiation curing can be performed at moderately elevated temperatures to further reduce polymerization time.

The preferred apparatus for the production of a lens from a polymerizable composition preferably includes a mold comprising a convexed and concaved surface defining the front and back surfaces of the lens to be formed wherein the space between the convexed and concaved surfaces of the mold form the internal cavity corresponding to the precise dimensions of the lens to be produced, capable of transmitting energy that is capable of initiating polymerization; an opening in the mold wherein the polymerizable composition may be introduced and added during the course of the polymerization; a source or sources of energy capable of initiating polymerization placed such that the energy is irradiated through the convexed and/or the concaved face of the mold; a moveable stage or stages comprising an adjustable slit, placed between the mold and the source of energy, that is capable of exposing the polymerizable composition in a sequential manner by moving the slit over the face of the mold beginning at a point opposite to that wherein the polymerizable composition is introduced and proceeding to the point wherein the polymerizable composition is introduced.

After applying the coating composition on the surfaces of one or both halves of the mold and partially curing, if necessary, the core resin composition, prepared by combining the appropriate polymerizable components with the photochemical initiator, is introduced into the mold.

The mold halves which are both UV transmissive, are held together by a housing system. A flexible gasket is sandwiched between and around the molds to hold the resin. The polymerizable fluid is poured into a reservoir and introduced between two mold halves. The resin is introduced into the bottom of the mold under positive pressure. Pressure of between 25 and 35 psi was maintained on the fluid during the entire process. The fluid was retained between the molds using a flexible PVC gasket and clamp assembly. Sequential polymerization is carried out on both sides beginning at point opposite to that wherein the polymerizable composition is introduced, and proceeding to the point wherein the polymerizable composition is introduced. The composition is sequentially polymerized using mercury vapor lamps and a horizontal slit assembly describe above and in U.S. Pat.

No. 5,114,632. The slit opening was varied from 0.25 to 1.0 inches. The sequential polymerization time varied between 8 to 27 minutes.

The fluid polymerizable composition, that is contained in the reservoir, is constantly resupplied to the cavity. A positive pressure, typically between 20 and 50 psi, is applied to the reservoir during the polymerization step. The optimal pressure is dictated by the flow arrangement, system viscosity, and rate of cure. Thus, as polymerization occurs in the region exposed to light, the shrinkage that occurs is immediately replenished by additional polymerizable composition. The polymerizable composition is highly mobile and flows readily to fill the volume lost during shrinkage of the part of the mixture that has already polymerized. The nearly instantaneous replacement of the space formed by shrinkage with unreacted fluid ensures a final object that is virtually defect free and distortion less.

Other similar schemes may be envisioned to produce the lens. Instead of a slit, a curtain may be lowered (or raised) first exposing UV light to the area opposite the feed port. The curtain is moved until the entire lens is exposed. Note that for this arrangement, the Uv exposure time is not constant throughout the sample, but depends on position. Another arrangement includes continually opening a slit starting from the center of the lens. Here, the central portion of the lens will have the longest exposure to the UV light. A disadvantage of this scheme is that two feed ports Is required at opposite ends of the direction the slit opens.

Only one port is required if instead of an increasingly expanding slit, an expanding hole is employed. This may be accomplished using an iris diaphragm. With the diaphragm, the initial UV exposure area is a small circular hole at the center of the lens assembly. This exposure area is radially increased by opening the diaphragm. By continuously opening the diaphragm, the entire lens assembly can be fully exposed. Since the edge will be the final area exposed to UV light, only one port is necessary for this process. The expansion rate will require adjustment depending on the reactivity of the sample, the UV intensity, and the thickness of the part being irradiated. The lens assembly may be held vertically or even horizontally during the curing process.

In an optional embodiment, after sequential polymerization is completed, a post cure step can be carried out wherein the entire mold cavity is exposed to blanket UV radiation. To ensure that defects do not appear, post curing should be carried out only when the entire lens is at a sufficiently advanced-stage of cure that shrinkage is minimal. Post curing is preferably performed while the article is still in the mold to prevent oxygen inhibition of the curing process. At the completion of the curing process, the mold structure can be taken apart and the precision cast part removed.

The equipment described above can be used to produce spherical, progressive and aspheric lenses.

The composition is preferably cured by exposure to radiation, such as radiation from a high energy ultraviolet light source. Typical UV radiation sources include an electrodeless tube lamp (made by Fusion Systems) or a medium pressure mercury vapor lamp tube (made by American Ultraviolet Products). The preferred wavelengths for photoinitiation are between 180 and 500 nanometers and the power output of the light source is preferably between about 5 and 500 watts.

Abrasion and Scratch Testing

The abrasion and scratch resistant properties of the coated lenses may be measured using the Bayer and Steel Wool tests respectively. In the Bayer test, a curved circular coated piece approximately 3 inch diameter is held tightly onto the bottom of a tray using clamps. A reference piece of the same curvature, diameter and thickness is also attached. Two holes are cut on the plate, one directly above the sample and the other above the reference piece. The plate is then filled with a known weight of a coarse grade sand. The entire assembly (plate, samples, and sand) is oscillated with an amplitude of 2.5" at a period of 100 cycles/minutes for two minutes. Oscillation is achieved using a motor that is connected to the oscillating plate through a revolving wheel. The same and the reference are then removed and the haze gain caused by the abrading sand is measured. Only fresh sand is used for each measurement. Results are based on uncoated CR-39 plates having a value of 1.0.

For a steel wool test, a test sample with known curvature is held tightly onto the base of a oscillating table using double sided tape. Steel wool abrasive (grade #000) is attached to a block with a 1×1 $in^2$ face and a complementary curvature also with double sided tape. The block is attached to a rod (110) and the assembly is mounted directly above the sample with the steel wool in contact with the test piece. The rod is held using bushings so that it moves freely in the vertical direction but not in the horizontal plane. A 5 lb weight is added to obtain the desired pressure on the sample. Pressure is calculated by adding up the weights (including the block and the rod) and dividing this by the area. The same is then oscillated against the steel wool. The amplitude of oscillation is 2" and the period is 100 cycles per minute. The test is concluded at the end of 100 cycles. Results are reported as haze gain after the sample is subjected to the testing.

The haze gain is obtained by measuring light transmission through the sample before and after testing. This is performed using a Perkin Elmer UV-Vis spectrophotometer.

Adhesion Testing

Adhesion of the coating to the lens core is conducted by soaking the lens sample in boiling salt water for one hour and then subjecting the coating to cross-hatch testing as described in ASTM D-3359. Acceptable adhesion means that none of the coating was removed during the test.

EXAMPLES

The following methodology was used to test the abrasion resistance and adhesion quality of the in-mold cured coatings. A small amount of coating material was dispensed onto the surface of a concave mold half. The coatings, which have viscosities over 1000 cp, were then wiped on over the entire mold half surface with a gloved finger. The mold was then assembled with the coated front mold and an uncoated rear mold so as to produce a plano lens. The mold assembly was then exposed to a mercury vapor grid lamp (from Jetlight) for between 0 to 15 seconds leaving a partially cured wet surface. The mold cavity was then filled with the following core formulation: 40% urethane diacrylate (Radcure), 40 dipentaerythritol acrylate (Sartomer), 20% highly ethoxylated trimethylolpropane triacrylate (Sartomer). The formulation had 0.2% 1173 photoinitiator (Ciba Geigy). The resin was then cured using the sequential curing process with two mercury vapor grid lamps (Jetlight) shining UV light at the front and rear molds. At the completion of the cure, the lens was ejected and subjected to abrasion and adhesion testing.

| Coating # | DiPeta (%) | E9TMPTA (%) | E15TMPTA (%) | Steel wool Haze gain (%) | Bayer |
|---|---|---|---|---|---|
| 1 | 67 | 33 | 0 | 0 | 1.2 |
| 2 | 80 |  | 20 | 0 | 1.2 |
| 3 | 100 |  |  | 0 | 1.2 |

DiPeta - 9041 (Sartomer)
E9TMPTA - 502 (Sartomer)
E15TMPTA - 9035 (Sartomer)

Each of these coating compositions used 0.4% 1173 (Ciba Geigy) photoinitiator. All tested lenses with these coating compositions had no adhesion failures.

What is claimed is:

1. A method of providing an optically clear coating to at least one optical surface of an ophthalmic device comprising the steps of:

applying a film of a composition comprising ethylenically unsaturated groups to at least a first face of a mold used to manufacture said ophthalmic device, wherein said face imparts a desired optical configuration to a first optical surface of said ophthalmic device;

partially curing said composition to a degree that said film forms a tacky, wet non-abrasion-resistant film that is weakly adhered to said first face and is characterized by a degree of unsaturation of over 90% of the unsaturation it possessed prior to said reaction;

filling the cavity of said mold with an organic liquid capable of hardening to a solid, stable state; and hardening said organic liquid and said film to form said ophthalmic device, to bond said film to the hardened organic material, to render said film abrasion resistant, and to adhere said film to said hardened organic material more firmly than said film adheres to said face of said mold.

2. A method according to claim 1 further comprising the step of removing said device from said mold whereby said film adheres to said hardened organic material and completely separate from said mold.

3. A method of providing an optically clear coating to at least one optical surface of an ophthalmic device consisting of the steps of:

applying a film of a composition comprising ethylenically unsaturated groups to at least a first face of a mold used to manufacture said ophthalmic device, wherein said face imparts a desired optical configuration to a first optical surface of said ophthalmic device;

filling the cavity of said mold with an organic liquid capable of hardening to a solid, stable state; wherein said composition has a viscosity greater than said organic liquid; concurrently hardening said organic liquid and said film to form said ophthalmic device, to bond said film to the hardened organic material, to render said film abrasion resistant, and to adhere said film to said hardened organic material more firmly than said film adheres to said face of said mold.

4. A method according to claim 1 or 3 wherein said composition containing ethylenically unsaturated groups comprises:

I: Ten to fifty parts of polyacryoylated alkane polyols, said alkane polyols containing up to about twenty carbon atoms and an average of at least three O-acryloyl groups; and II: Twenty to eighty parts of alkane polyols, said alkane polyols containing up go about twenty carbon atoms and an average of at least three O-[acryloyl-(polyalkylene oxide)] chains; wherein each of said polyalkylene oxide chains comprise from one to twenty alkylene oxide groups.

5. A method according to claim 4 wherein said alkane polyols in said component I contain three to five of said O-acryloyl groups.

6. A method according to claim 4 wherein said component II said alkylene oxide comprises ethylene oxide or propylene oxide.

7. A method according to claim 4 wherein component I is a compound or mixture of compounds of the formula

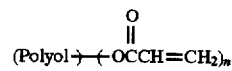

wherein n represents an average number greater or equal to 3.

8. A method according to claim 4 wherein said polyol in component II is a compound or mixture of compounds the formula

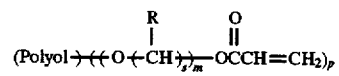

wherein p represents an average number greater than or equal to three; each m is independently an integer from one to twenty; s is from one to six, and each R group is independently H or lower alkyl.

9. A method according to claim 8 wherein S is two.

10. A method according to claim 9 wherein both R groups are H.

11. A method according to claim 8 wherein one R group is H and the other is methyl.

12. A method according to claim 1 or 3 wherein said composition containing ethylenically unsaturated groups comprises:

I: Twenty to forty parts of polyacryoylated alkane polyols, said alkane polyols containing up to about twenty carbon atoms and an average of at least three O-acryloyl groups; and II: Fifty to eighty parts of alkane polyols, said alkane polyols containing up to about twenty carbon atoms and an average of at least three O-[acryloyl-(polyalkylene oxide)] chains; wherein each of said polyalkylene oxide chains comprise from one to twenty alkylene oxide groups.

13. A method according to claim 11 wherein said alkane polyols in said component I contain three to five of said O-acryloyl groups.

14. A method according to claim 1 wherein said component II said alkylene oxide comprises ethylene oxide or propylene oxide.

15. A method according to claim 11 wherein component I is a compound or mixture of compounds of the formula

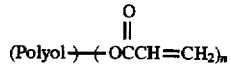

wherein n represents an average number greater or equal to 3.

16. A method according to claim 11 wherein said polyol in component II is a compound or mixture of compounds the formula

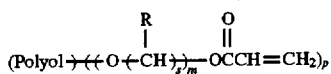

wherein p represents an average number greater than or equal to three; each m is independently an integer from one to twenty; s is from one to six, and each R group is independently H or lower alkyl.

17. A method according to claim 16 wherein S is two.

18. A method according to claim 17 wherein both R groups are H.

19. A method according to claim 17 wherein one R group is H and the other is methyl.

20. A method according to claim 1 or 3 wherein said organic liquid comprises
  I. up to 60 weight percent of urethane oligomers, or mixtures thereof, end terminated with acrylate or methacrylate, or mixtures of acrylate and methacrylate;
  II. 10 to 80 parts of polyacryloylated alkane polyols, wherein the alkane polyols contain up to about 20 carbon atoms greater than 2 up to about 10 O-acryloyl groups; and
  III. 80 to 10 parts of polyalkoxylated polyacryloylated alkane polyols, wherein the alkoxylated alkane polyols contain up to about 20 carbon atoms and greater than 2 up to about 10 O-acryloyl groups.

21. The method of claim 20 wherein said organic liquid comprises an additive selected from the group consisting of free radical initiators, UV absorbers, mold release agents, stabilizers, dyes, antioxidants, and wetting agents.

22. The method of claim 20, wherein the urethane is a difunctional or polyfunctional prepolymer of the structure:

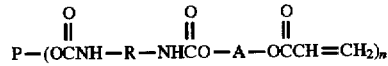

wherein P is an aliphatic or aromatic polyether, polyester or polyol, R is the residue of the diisocyanate to which the isocyanate moieties are attached, n is 2 or 3, and A is the aliphatic or aromatic ester portion of a hydroxylated acrylate or methacrylate.

23. The method of claim 20, wherein the urethane oligomer contains between 2 and 6 acrylate or methacrylate groups.

24. The method of claim 20, wherein the oligomer has molecular weight of between 400 and 7000.

25. The method of claim 20, wherein the oligomer has a molecular weight of between 800 and 2500.

26. The method of claim 20, wherein the oligomers used are a combination of difunctional and trifunctional urethane acrylates.

* * * * *